United States Patent
Colburn et al.

3,770,335
Nov. 6, 1973

[54] COMPOSITE MAGNETIC MIRROR AND METHOD OF FORMING SAME

[75] Inventors: Steven C. Colburn, La Palma; Charles A. McPherson, Upland; Roger A. Miller, Montclair, all of Calif.

[73] Assignee: General Dynamics Corporation, Pomona, Calif.

[22] Filed: July 1, 1971

[21] Appl. No.: 158,818

[52] U.S. Cl. ................................. 350/1, 350/288
[51] Int. Cl. ........................................... G02b 5/20
[58] Field of Search ................. 350/1, 151, 310, 350/288, 299; 204/38; 65/59; 161/196

[56] References Cited
UNITED STATES PATENTS

| | | | |
|---|---|---|---|
| 3,224,333 | 12/1965 | Kolk, Jr. et al. | 350/151 |
| 2,464,141 | 3/1949 | Maier | 350/310 |
| 3,098,803 | 7/1963 | Godycki | 204/38 |
| 1,394,085 | 10/1921 | Halvorson | 350/310 |

FOREIGN PATENTS OR APPLICATIONS

| | | | |
|---|---|---|---|
| 1,157,934 | 9/1958 | France | 350/321 |

OTHER PUBLICATIONS

Barnes, "A New Optical Bench," J.O.S.A. Feb. 1944, Vol. 34, No. 2, pp. 110–111.
Barnes "Optical Bench" 34(2), J.O.S.A. 110–111. (Feb. 1944).

*Primary Examiner*—David Schonberg
*Assistant Examiner*—Michael J. Tokar
*Attorney*—Albert J. Miller et al.

[57] ABSTRACT

Disclosed is a composite magnetic mirror having a reflective surface deposited upon a glass-magnetic material composite. Also disclosed is the method for producing the composite by fusing a preformed glass blank to a magnetic material substrate.

8 Claims, 2 Drawing Figures

PATENTED NOV 6 1973

3,770,335

INVENTORS.
STEVEN C. COLBURN
CHARLES A. MCPHERSON
ROGER A. MILLER
BY Albert J. Miller
ATTORNEY

COMPOSITE MAGNETIC MIRROR AND METHOD OF FORMING SAME

BACKGROUND OF THE INVENTION

Magnetic mirrors are utilized extensively to reflect and focus infra-red energy. Ideally, it would be desirable to fabricate the mirror of a magnetic material and then simply polish the magnetic material to obtain the reflective quality required. Magnetic materials by nature are, however, to porous to provide satisfactory reflective surfaces.

In order to overcome the porosity of the magnetic materials, inserts of stainless steel have been bonded to the magnetic material with an organic binder or adhesive. The stainless steel can then be polished to a mirror quality to produce a surface on which the reflective material can be vapor deposited. While acceptable magnetic mirrors have been produced in this manner, the organic adhesive tends to relax with time causing the mirror to go out of focus.

Stresses developed during the honing and subsequent machine polishing are then relieved, permitting the mirror plane to shift.

Conventional methods of applying a glass or enamel surface to the magnetic material likewise do not produce satisfactory results. While a good smooth enamel can be produced by crushing a glass frit into a fine grain powder, applying the crushed glass to the magnetic material suspended in a aqueous solution either in a slurry or by spraying, and then fusing the glass to the magnetic material, the resultant enamel is extremely porous immediately under the surface. This sub-surface porosity, promoted by chemically combined water in the aqueous solution, hydrogen gas entrapped in the magnetic material, voids entrapped during the fusion of the glass, and chemical reactions at the glass magnetic material interface, cannot be tolerated. Subsequent polishing of the enamel exposes these pores and produces non-reflective areas.

Other standard enameling techniques, such as flame spraying of glass frit onto the magnetic material, produce similar results. In addition to subsurface porosity, the flame sprayed glass layer includes interstitial voids and is subject to peeling or releasing from the magnetic material.

SUMMARY OF THE INVENTION

The invention is directed to a composite magnetic mirror in which the reflective surface is deposited upon a homogeneous, non-porous, glass layer fused to a substrate of a magnetic material. A protective, scratch resistant surface may be deposited upon the reflective surface.

The composite is formed by fusing a homogeneous, non-porous, glass blank to the magnetic substrate and then depositing the reflective surface. By casting a lead borosilicate glass blank and fusing it to an alnico substrate, a composite can be produced having a stable interface with the glass in a state of compression at room temperature and with the magnetic properties of the alnico unaffected by the fusing. The glass retains its homogeneous, non-porous, as-cast condition which is suitable for a reflective surface.

DESCRIPTION OF THE PREFERRED EMBODIMENTS

Figure 1:
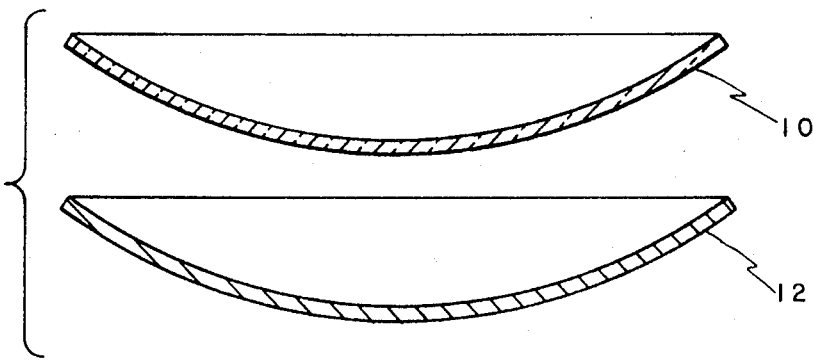
FIG. 1 is a sectional view illustration of the magnetic material substrate and the pre-formed glass blank before being formed into the composite magnetic mirror.
Figure 2:
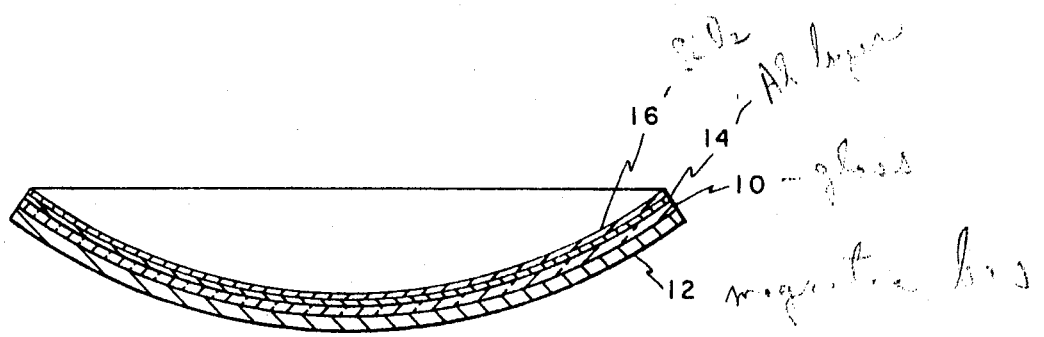
FIG. 2 is a sectional view illustration of a formed composite magnetic mirror.

As illustrated in FIG. 1, the composite magnetic mirror basically comprises two elements, a magnetic substrate 12 and a pre-formed glass blank 10. The magnetic substrate 12 is first formed into the configuration desired for the composite mirror, such as the dish illustrated in FIGS. 1 and 2. Suitable magnetic materials for the substrate 12 include the alnico metals, with alnico VI being preferred. As is generally known, alnico is an alloy containing aluminum, nickel, cobalt and iron.

The pre-formed glass blank 10 should generally have the same configuration as the magnetic substrate 12. As will be explained later, considerable deviation from the substrate configuration can be tolerated and may be desired. It is important, however, that the glass have a co-efficient of thermal expansion that closely matches that of the magnetic material in the substrate. Also, the glass should have a melting and forming temperature below the temperature that would adversely affect the magnetic properties of the substrate.

Alnico VI has a linear thermal expansion of 11.3 $\times 10^{-6}$ in/in/°C from 20°C to 300°C and its magnetic properties are not adversely affected below 930°F. Lead borosilicate glasses or enamels have generally low softening points well below 930°F and their co-efficients of thermal expansion can be significantly changed by minor additions of certain compounds.

Since the co-efficient of thermal expansion for glass is not linear but undergoes a radical change at about its equivalent rate temperature, a precise match with the magnetic substrate is not possible. Since glass is a brittle material, and almost always fails in tension, the glass should be designed to be in a state of compression with respect to the magnetic substrate at room temperature. This can be accomplished by developing a glass that from room temperature to its equivalent rate temperature has a slightly lower expansion co-efficient than the magnetic substrate.

The glass blank 10 must be carefully prepared to produce the desired characteristics. A lead borosilicate glass having the following final composition has been found to be suitable.

| OXIDE | RANGE (%) | NOMINAL (%) |
|---|---|---|
| Lead Oxide | 75–85 | 80 |
| Boric Oxide | 5–15 | 10 |
| Silicon Dioxide | 0–10 | 5 |
| Zinc Oxide | 0–10 | 5 |

A glass melt with the above nominal final composition can be produced from the following raw materials:

| RAW MATERIAL | PARTS BY WEIGHT |
|---|---|
| Lead Oxide | 9.4 |
| Lead Monosilicate (PbO-2/3 S$_i$O$_2$) | 7.6 |
| Boric Acid (H$_3$BO$_3$) | 3.5 |
| Zinc Oxide (ZnO) | 1.0 |

The raw materials are carefully weighed and then heated in a crucible until the materials fuse into a homogeneous melt. The melt should be held at this temperature (between 875°F and 900°F) for a sufficient time, up to several hours, to allow all gas bubbles to escape from the melt. The molten glass melt is then cast into a graphite, or other suitable material, casting mold to form the glass blank 10 in the desired configuration. The casting mold may be preheated if desirable. The cast glass blank can be removed from the casting mold and cooled slowly or left in the casting mold to cool. While annealing of the glass blank is not required, it must be cooled at a rate slow enough to prevent fracturing. A homogeneous, non-porous glass blank can thus be produced.

The composite magnetic mirror is then formed by positioning the glass blank 10 on the magnetic substrate 12. The assembled glass blank and magnetic substrate are then heated to fuse the glass blank to the magnetic substrate without causing the glass to flow. A stable interface between the glass and the magnetic substrate can be formed by heating the assembly to slightly less than the glass flow temperature, at which temperature the glass softens or slumps but does not flow. This low temperature will not alter the magnetic properties of the substrate. Since the glass only slumps and does not flow, it remains quite viscous and any bubbles formed at the interface cannot migrate through the glass. The composite is then carefully annealed to relieve all stresses. While both the glass blank 10 and magnetic substrate 12 have been shown as dish shaped in FIG. 1, the glass blank could easily be a flat disc in which case the softening of the glass would permit it to assume its final configuration. A thin film of finely ground glass frit, having a similar composition as the glass blank may be provided between the blank 10 and substrate 12 to facilitate bonding.

If desired, the glass can be ground and/or lapped to produce the requisite contour and mirror quality. Degreasing with an appropriate solvent, followed by a thorough drying should be performed after the glass is lapped.

The reflective surface 14 can be formed by vacuum vapor depositing a uniformly thick coating of a reflective material, such as aluminum metal, upon the glass surface. An overlay surface 16 such as a vacuum vapor deposited protective coating of silicon monoxide may be applied to the reflective surface 14. A scratch resistant surface is produced by oxidizing the silicon monoxide to silicon dioxide in a warm oxidizing atmosphere. Alternately, the overlay surface 16 may be a vacuum vapor deposited coating such as magnesium fluoride. In either case, the reflective surface 14 may be cleaned, if necessary, before the overlay surface 16 is applied.

Thus a composite magnetic mirror, capable of reflecting and focusing infra-red energy, is produced. The glass has a thermal co-efficient of expansion comparable to that of the magnetic substrate and will be in compression with respect to the substrate at room temperature. The magnetic properties of the substrate are not adversely affected during the forming of the composite.

While specific embodiments of the invention have been illustrated and described, it is to be understood that these embodiments are provided by way of example only and that the invention is not to be construed as being limited thereto, but only by the proper scope of the following claims.

What we claim is:

1. A composite magnetic mirror comprising:
   a substrate of a magnetic material;
   a homogeneous, non-porous, glass layer fused to one surface of said magnetic material substrate; and
   a relfective surface deposited upon the homogeneous, non-porous, glass layer.

2. The composite magnetic mirror of claim 1 and in addition a scratch resistant protective surface deposited upon the reflective surface.

3. The composite magnetic mirror of claim 1 wherein said magnetic material is alnico and said glass is a lead borosilicate glass.

4. The composite magnetic mirror of claim 3 wherein the lead borosilicate glass is in a state of compression with respect to the alnico at room temperature.

5. The composite magnetic mirror of claim 4 wherein said lead borosilicate glass has a nominal composition of 80% lead oxide, 10% boric oxide, 5% silicon dioxide and 5% zinc oxide.

6. The composite magnetic mirror of claim 4 wherein said lead borosilicate glass has a composition of 75–85% lead oxide, 5–15% boric oxide, 0–10% silicon dioxide, and 0–10% zinc oxide.

7. A composite magnetic mirror comprising:
   a substrate of an alnico permanent magnetic material;
   a homogeneous, non-porous, lead borosilicate glass layer, having a thermal coefficient of expansion comparable to alnico, fused to one surface of said substrate, said glass layer in a state of compression with respect to the alnico at room temperature;
   a reflective surface deposited upon the glass layer; and
   a scratch resistant protective surface deposited upon said reflective surface.

8. The composite magnetic mirror of claim 7 wherein said scratch resistant protective surface is a layer of silicon dioxide.

* * * * *